(12) United States Patent
Bengala

(10) Patent No.: US 6,260,001 B1
(45) Date of Patent: Jul. 10, 2001

(54) PROCESS AND APPARATUS FOR MEASURING THE VOLUME OF AN OBJECT BY MEANS OF A LASER SCANNER

(75) Inventor: Moreno Bengala, San Lazzaro di Savena (IT)

(73) Assignee: Datalogic S.p.A., Bologna (IT)

( * ) Notice: Subject to any disclaimer, the term of this patent is extended or adjusted under 35 U.S.C. 154(b) by 0 days.

(21) Appl. No.: 09/000,792

(22) Filed: Dec. 30, 1997

(30) Foreign Application Priority Data

Dec. 31, 1996 (EP) .................................................. 96830668

(51) Int. Cl.$^7$ .................................................. G02B 26/10
(52) U.S. Cl. .......................... 702/156; 702/159; 356/379; 250/559.21
(58) Field of Search ..................................... 702/156, 159, 702/170, 172; 73/149; 356/376, 386, 387, 381, 379; 250/559.22, 559.21, 559.23, 559.19, 559.24, 559.29

(56) References Cited

U.S. PATENT DOCUMENTS

| 4,939,355 | * | 7/1990 | Rando et al. ........................ 235/467 |
| 5,412,420 | | 5/1995 | Ellis ........................................ 348/35 |
| 5,481,361 | * | 1/1996 | Yumiki et al. ........................ 356/375 |
| 5,615,003 | * | 3/1997 | Hermary et al. ..................... 356/3.03 |
| 5,629,773 | * | 5/1997 | Wakai et al. ......................... 356/376 |
| 5,661,561 | * | 8/1997 | Wurz et al. ........................... 356/386 |
| 5,723,852 | * | 3/1998 | Rando et al. ......................... 235/467 |
| 5,739,426 | * | 4/1998 | Storm ..................................... 73/149 |
| 5,770,848 | * | 6/1998 | Oizumi et al. ....................... 235/462 |
| 5,812,268 | * | 9/1998 | Jackson et al. ...................... 356/376 |
| 5,831,719 | * | 11/1998 | Berg et al. ........................... 356/5.13 |

FOREIGN PATENT DOCUMENTS

| 0600800 | 6/1994 | (EP) . |
| 4240094 | 6/1994 | (DE) . |
| 0690287 | 1/1996 | (EP) . |
| 2189594 | 10/1987 | (GB) . |
| WO92/16818 | 3/1992 | (WO) . |

* cited by examiner

*Primary Examiner*—Patrick Assouad
(74) *Attorney, Agent, or Firm*—Sughrue, Mion, Zinn, Macpeak & Seas, PLLC

(57) ABSTRACT

The process uses information from the scan sweeps of a laser scanner to obtain a set of stipulated areas which correspond to successive cross-sections of the object and are reckoned by moving the object relative to the scanner. The volume is obtained by multiplying each of these areas by the feed distance of the object. The angles of inclination of the scan plan can selectively be taken into account, or ignored when sufficiently small. The volume measurement may be taken at the same time as an optical code provided on the object is read.

16 Claims, 2 Drawing Sheets

PROCESS AND APPARATUS FOR MEASURING THE VOLUME OF AN OBJECT BY MEANS OF A LASER SCANNER

BACKGROUND OF THE INVENTION

This invention relates to a process for measuring the volume of an object by means of a laser scanner, and to an apparatus implementing the process.

A problem shared by many segments of industry and trade is that of assessing the volume of an object. In particular, the supply and shipment of goods demand that the volume of packages be measured in an automated fashion to provide an element of information which is valuable to the conduction of both the storehouse premises and the carrier means.

Storehouse premises and carriers generally handle objects according to their weight, and to one or more of their linear dimensions regarded as most significant. This handling style is, therefore, approximative and surely less than fully satisfactory.

SUMMARY OF THE INVENTION

Accordingly, a first aspect of the invention concerns a process for measuring the volume of an object with at least a laser scanner, which process comprises the steps of:

a) placing the object onto a bearing surface;

b) defining a feed direction for the object on the bearing surface;

c) defining a scan plane, intersecting the plane of the bearing surface along a scan base line which lies transverse to the feed direction, with a laser beam from a scanner that overlies the bearing surface being arranged to act in the scan plane;

d) moving the object across the bearing surface along the feed direction, relative to the scan plane, until the scan plane will intersect the object;

e) obtaining the height, above the bearing surface, of n points of measurement contained in a top face of the object and on the scan plane;

f) defining a stipulated height as a function of the measured heights of two successive points of measurement;

g) obtaining the plane position on the bearing surface of the n points of measurement;

h) defining a stipulated base as a function of the plane positions on the bearing surface of each pair of adjacent points of measurement;

i) computing a stipulated area element, vertical to the bearing surface, for each pair of adjacent points of measurement, as by multiplying the stipulated base by the stipulated height;

j) computing a stipulated area as the combined sum of the stipulated area elements computed;

k) moving the object relative to the scan plane a predetermined feed distance along a feed direction across the bearing surface;

l) defining a stipulated thickness as a function of the feed distance;

m) computing a volume element by multiplying the stipulated area by the stipulated thickness;

n) repeating steps e) to m) above until the entire object is scanned;

o) computing the object volume as the combined sum of all the volume elements.

The term top face is here a generic one, it encompassing any surface seen by the laser scanner placed above the bearing surface. In particular, even a sloping side surface may be taken to be the top face, whose slope is an upward taper angle of the object as referred to its rest position on the bearing surface.

The movement of step d) above should be understood as a relative movement. Thus, it may either be a movement of the object relative to a fixed scan plane, or a movement of the scan plane relative to an object held stationary, or both.

This process provides a reasonably accurate assessment of the volume of an object. The measurement is an approximate one, as usual, for two basic reasons.

A first reason is that the volume considered would not be the true volume of the object, but rather that included between the top face of the object lying on the bearing surface and its orthogonal projection onto the bearing surface. In practice, only the top face of the object is picked up for measurement, the assumption being that the top face is planar and the side faces square to the underside; therefore, any dimples present in faces other than the top face are taken to be solid. However, this approximation suits well the practical requirements for volume measurement; in fact, the geometric volume of the object is of less concern than its overall hamper, and it is preferred if possible dimples are left out as actually unaffecting hamper.

The second reason is that the measurement is arrived at by a spot reckoning procedure (the points of measurement) carried out on the top face of the object, rather than over the whole surface of that face. Anyhow, this approximation can be improved upon as required by increasing the number of points of measurement.

The spatial positions of the points of measurement may be reckoned with the scanner in different ways. Preferably, this is done by taking a first measurement in polar coordinates (centered on the origin of the virtual scan source, i.e. on the imaginary point whence the scan rays appear to issue, which point may lie within or outside the scanner and be fixed or movable, according to the optics being used), and then converting it to Cartesian coordinates in accordance with a stipulated system which has two axes in the plane of the bearing surface, a first of such axes being parallel to the feed direction, and a third axis perpendicular to the plane of the bearing surface. This arrangement is preferred because the measurement is related to coordinates which suit well the measuring instrument (the scanner movement is a polar type), and the computed result is expressed in coordinates which suit well the quantities to be measured and the calculations later to be performed.

The quantities which have been indicated as stipulated may be selected in different ways, according to the degree of approximation sought. Suitably, the stipulated height is computed as equal to the height of one of the two points of measurement (any one, the first or the second, the smallest or the largest), or preferably equal to the average (suitably the arithmetical average) between the heights of the two points of measurement. The stipulated base is preferably computed as equal to the difference between the values of the coordinates of the two measurement points along the second axis (y), or as equal to the distance between the projections of the two measurement points onto the plane of the bearing surface (x-y). The stipulated thickness is preferably proportional to the feed distance. These choices enable the slope α of the scan line with respect to the perpendicular to the feed direction (axis y) to be taken into account in a very simple manner.

Preferably, the scan plane is vertical to the bearing surface. This arrangement makes the computation easier;

otherwise, it would be necessary to take account of the inclination of the scan plane from the vertical to the bearing surface.

A second aspect of the invention concerns an apparatus for measuring the volume of an object, comprising:

a bearing surface for the object, whereacross an object feed direction is defined;

at least a laser scanner overlying the bearing surface and arranged to act in a scan plane intersecting the plane of the bearing surface along a scan base line transverse to the feed direction;

a processing unit linked to the scanner;

a means of moving the object across the bearing surface relative too the scan plane along the feed direction;

a means of sending a signal to the processing unit each time that the object is moved a predetermined feed distance relative to the scan plane;

wherein the scanner and/or processing unit is operative to:

reckon the height above the bearing surface of n points of measurement contained in a top face of the object and in the scan plane;

define a stipulated height as a function of the reckoned heights of two successive points of measurement;

reckon the plan position of the n points of measurement on the bearing surface;

define a stipulated base as a function of the plan position on the bearing surface of each pair of adjacent points of measurement;

compute a stipulated area element, vertical to the bearing surface, for each pair of adjacent points of measurement, as by multiplying the stipulated base by the stipulated height;

compute a stipulated area as the combined sum of the computed stipulated area elements;

define a stipulated thickness as a function of the feed distance;

compute a volume element by multiplying the stipulated area by the stipulated thickness;

repeat the foregoing steps until the entire object is scanned;

compute the volume of the object as the combined sum of all the volume elements.

This apparatus can implement the previously described process.

BRIEF DESCRIPTION OF THE DRAWINGS

Further features and advantages of the invention will be apparent from the following detailed description of some preferred embodiments thereof, given with reference to the accompanying drawings. In the drawings.

DETAILED DESCRIPTION OF THE INVENTION

Figure 1:
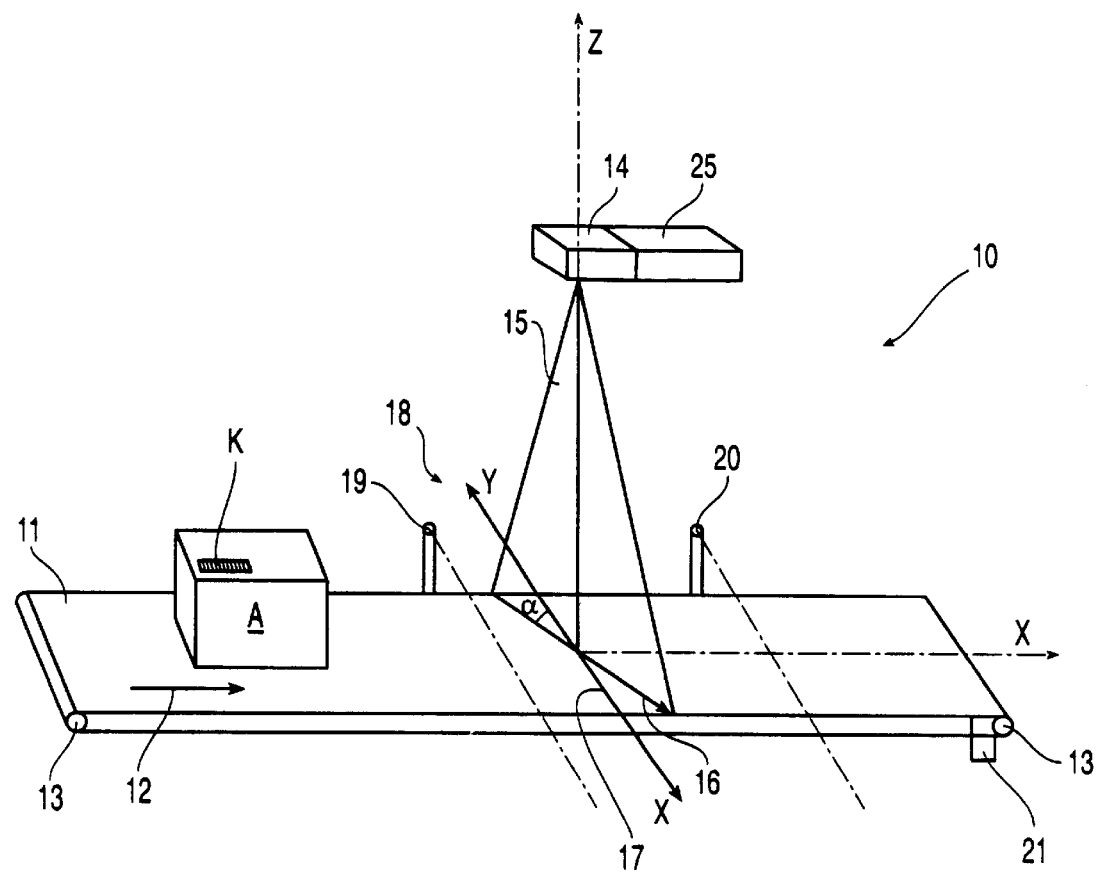
FIG. 1 is a perspective view showing schematically an apparatus according to the invention.

Shown in FIG. 1 is an apparatus 10 which comprises a bearing surface 11 for objects A, whose volume is to be measured. The bearing surface 11 is substantially horizontal and consists preferably of a belt conveyor, also denoted by the numeral 11, which can be driven along a feed direction 12 and is guided by rollers 13 one of which is powered.

The apparatus 10 includes a modulated light laser scanner 14 capable of measuring a distance, e.g. a similar one to that described in U.S. Pat. No. 5,483,051 by this Applicant, it utilizing a laser beam which sweeps a scan plane 15 incident onto the plane of the bearing surface 11. Specifically, the scanner 14 is placed above the bearing surface 11; the scan plane 15 is perpendicular to the bearing surface 11 and intersects it along a scan base line 16; and the scan base line 16 is inclined at an angle $\alpha$ to a line 17 of the bearing surface 11 which lies perpendicularly to the feed direction 12.

The section of the bearing surface 11 next to the scan base line 16, and indicated as the scan zone 18, is bounded by an entry detector 19 and an exit detector 20, both being preferably comprised of photocells.

Figure 2:
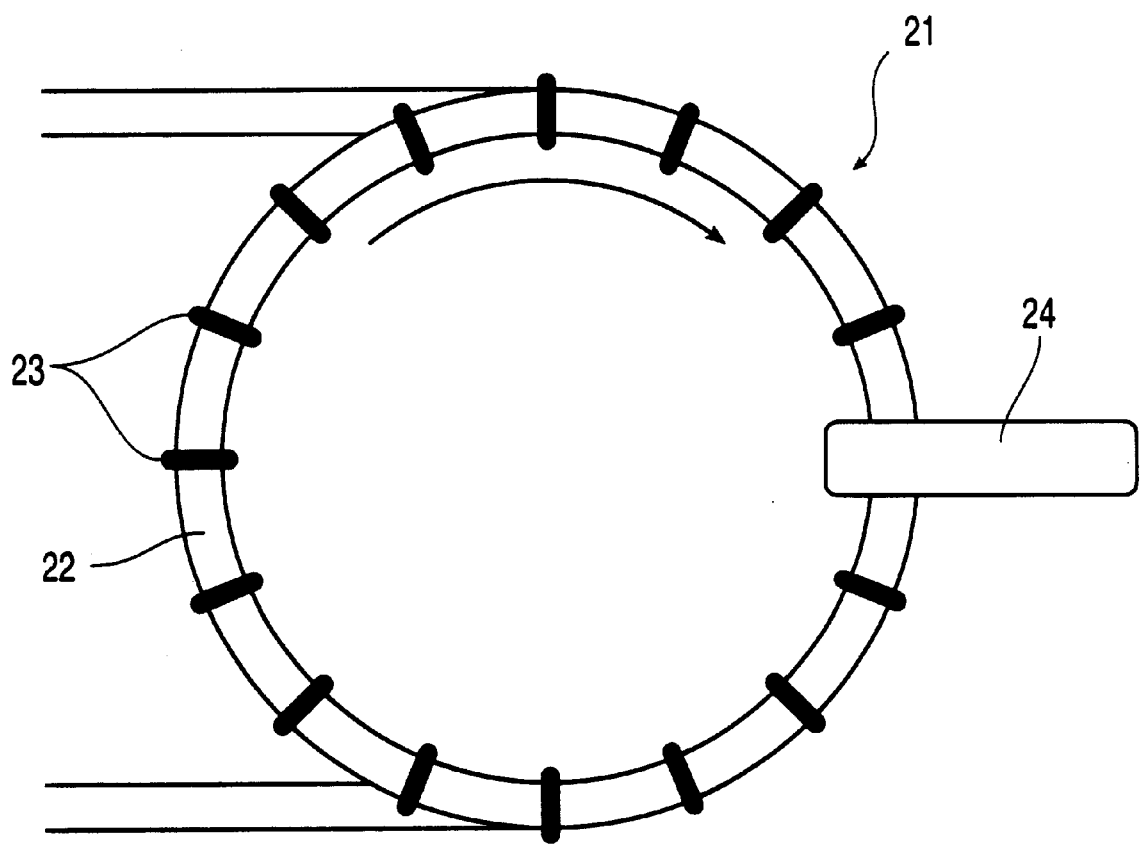
FIG. 2 is a schematic representation of an encoder incorporated to the apparatus of FIG. 1.

The bearing surface 11 is provided with an encoder 21, that is with a device adapted to issue a signal each time that the bearing surface 11 is moved exactly through a predetermined feed distance. The encoder 21 may be of any type, e.g. electro-optical as shown schematically in FIG. 2. One of the rollers 13 carries, rotatively fixed with it, a disk 22 marked with notches 23 at substantially tangential positions with respect to the plane of the bearing surface 11 which are formed at circumferential spacings equal to the feed distance sought; an electro-optical notch recognition device 24 is arranged to "see" the notches 23 moving past it and output a signal at each passing notch 23.

Also provided is a processing unit 25, which may be incorporated to the scanner 14 or separate and suitably connected to it.

The apparatus 10 operates as follows. Objects A to be measured for volume are placed onto the belt conveyor 11, at a spacing from one another. The continuous motion of the belt conveyor 11 will take each object A to the entry detector 19, and then to the scan zone 18. The object movement past the entry detector 19 triggers the delivery of a signal to the processing unit 25, whereby the unit will initiate the measuring procedure.

The encoder 21 also delivers a signal to the processing unit 25, during the movement of the belt conveyor 11, each time that the belt conveyor, carrying the object A, travels a distance same as the predetermined feed distance. Each time that a signal is received from the encoder 21, a sampling operation is performed; the scanner 14, once enabled by the sensor 19, will in fact scan the object A continuously, but the processing unit 25 only store the n values of the corresponding scan sweep to the encoder signal. It should be noted that the infeed speed of the belt conveyor 11, albeit quite fast, is far slower than the sweep rate of the laser beam of the scanner 14, so that the distance moved by the object A relative to the scan plane 15 during the time taken by the scanner 14 for a full sweep across the scan plane 15 is quite trivial.

Upon the object A reaching the scan base line 16, the laser beam of the scanner 14 will impinge on the object A, striking its top face. Under control by the processing unit 25, the scanner 14 reckons the height of n reckoning points contained in the top face of the object A above the bearing surface 11.

To this aim, the scanner 14 reckons, for each reckoning point, both its distance from the scanner 14 (or rather, from the imaginary point whence the rays appear to issue) and the angular position of the laser beam, thereby obtaining the values in polar coordinates of the position of that point in the scan plane 15. These values are then processed by the unit 25 to obtain values therefrom which are representative of the position of the point in a system of Cartesian coordinates whose x axis is coincident with the feed direction, y axis is directed along the line 17 (that is, such that the x-y plane will coincide with that of the bearing surface 11), and z axis directed upwards. For this conversion, the angle α (i.e., the slope of the scan line with respect to the y axis) and the scanner position must be known. The computations involved in this conversion will not be discussed herein because known per se and well within the capability of a person of ordinary skill in the art. Of course, any other selected Cartesian reference system in space could be reduced to that indicated, by a mathematical operation of rotation/translation, and accordingly, can be regarded as equivalent to the indicated system.

At each scan sweep the reckoning is effected for a predetermined number, n, of points on the top face of the object A, thereby obtaining an outline of the top face cross-section of the object in the scan plane 15 by point approximation.

During the scanning, for each pair of successive reckoning points, the processing unit 25 will calculate an elementary area as the product of a stipulated height by a stipulated base, and store it.

The stipulated height may be the height above the bearing surface 11 (i.e., the z coordinate) of the first or the second point in the pair, or be the smaller or larger thereof, or an average therebetween; the stipulated height is selected according to the type of approximation sought and the computation complexity to be required of the processing unit 25. This aspect will be best appreciated at the end of the description of the whole measuring procedure.

The stipulated base may simply be the difference between y coordinates of the two points (case a), or be the distance between the two projected points onto the x-y plane (case b).

On completion of a scanning sweep, and after the values of the corresponding elementary areas to all the pairs of points have been stored, a stipulated area is computed as the combined sum of all the elementary areas of that scan sweep. The computed stipulated area may be differently interpreted, according to which stipulated base has been selected for each pair of reckoning points.

If the distance between the projections of the two points of reckoning onto the plane x-y is selected for the stipulated base (case b), then the stipulated area is an approximate measurement of the cross-section area of the object in the scan plane.

If the difference between y coordinates of the reckoning points is selected for the stipulated base (case a), then the stipulated area represents no longer the measurement of the object cross-section area in the scan plane, but rather its projection onto the y-z plane, again in an approximate way.

In either cases, the approximation is due to two errors. A first error originates from that the area included between the intersection of the scan plane with the object top face and the bearing surface (or x-y plane) is considered, and the possible presence of dimples in the side and under faces of the object neglected. This error cannot be controlled by this measuring process, and must be accepted. However, as previously mentioned, a measurement affected by such an error would still suit the purpose of the inventive process, and even better so than a true measurement. The second error is due to that only a few points on the intersect of the scan plane with the object top face are picked up for reckoning. This error can be minimized as desired, or at least controlled as required, by either increasing the number of reckoning points or suitably selecting the stipulated height. In fact, selecting the smallest height value would result in the area being measured to the nearest number below, and selecting the largest value would result in the area being measured to the nearest number above. Selecting the average value between the z heights of the two adjacent reckoning points would attenuate the error, but fail to presumptively specify whether the error is one to the nearest number above or below. Selecting the height of either the first or the second point allows of no control.

In the next step, the stipulated area is multiplied by a stipulated thickness to provide an elementary volume. In case a, the stipulated thickness will be assumed to be the equal of the feed distance. In case b, account must be taken of the slope of the scan line to the y axis; accordingly, the stipulated thickness will be assumed to be equal to the feed distance multiplied by cosα. In either cases, the elementary volume corresponds (with the same allowance as previously made for the stipulated area) to the volume of the object portion spanning two successive scan sweeps.

Thereafter, it is waited until the object A moves through a predetermined feed distance; this being signalled by the encoder 21 controlling a fresh sampling. In this way, successive cross-sections of the object A are scanned, each time computing the stipulated area and the elementary volume. All the computed values of elementary volume are stored into the processing unit.

This goes on as long as the object A locates in the scan zone 18. At a certain point, the exit detector 20 will signal that the object A has gone out of the scan zone 18; thereupon, the processing unit 25 will terminate the measuring procedure and add together all the elementary volumes stored during the scan sweeps, thereby to provide an approximate measurement of volume of the object A.

The start and end of an object volume measuring procedure, as just described, are controlled by the movement of the object past the entry detector 19 and the exit detector 20. Alternatively, one or both of these detector may be omitted, and their function served by the processing unit 25 using appropriate software to enable the measuring procedure (as by clearing the count of elementary volumes) upon a scan sweep corresponding to a non-zero stipulated area, and stop it (as by detecting the sum of the stored elementary volumes) upon completion of a predetermined consecutive number of scan sweeps with zero stipulated area; this number may be as low as 1, or at any rate a small number.

Where the measuring procedure is initiated by a software means, the scanner 14 must be kept operating all the time, even if no measuring procedure is in progress, in order for the arrival of an object to be detected. On the other hand, the provision of an entry detector 19 allows the scanner 14 to be disabled when there are no objects to be measured, and accordingly, despite the added complication to the structure entailed thereby, it is preferred wherever a markedly discontinuous inflow of objects for measurement is anticipated. By contrast, the presence or absence of an exit detector 20 would not impair the ability to turn off the scanner 14 at the end of the measuring procedure. Therefore, the preference goes to the embodiment wherein the end of the measuring procedure is detected by software means.

In certain cases, a higher degree of accuracy may be needed in computing the volume of objects which are markedly irregular in shape, that is objects having bulging portions which cannot be neglected. In such cases, additional scanners may be arranged on one or both sides of the belt conveyor 11. Thus, a more accurate assessment of the volume can be obtained by measuring the distances of points on the side surfaces. It could also be arranged for the belt conveyor 11 to be transparent to laser light, and another laser to be placed under the belt; the bottom laser would then measure the distances of points on the underside of the object to thereby provide a true measurement of volume.

Preferably, the apparatus 10 further includes a means of reading an optical code K (such as a bar code, a two-dimensional code, a color code, or the like) associated with the object A. A dedicated scanner could be provided or the scanner 14 itself used for the purpose.

In the apparatus described hereinabove, the information about an object A provided by scanning, i.e. the measurement of its volume and any information to be obtained by reading the optical code K, is preferably recorded in a file stored within the processing unit, so that the file will ultimately contain information covering all the objects that have been moved across the bearing surface. This information can later serve various purposes, e.g. conducting the storehouse premises or loading carriers, printing labels to be attached to the objects, or else.

Finally, it should be noted that when the angle α is a small one, less than 15°, the error introduced by neglecting it is minimal, on the order of a few percent; on the other hand, an attempt to take it into account would entail substantial complexity for the computations. In many instances of practical applications of an apparatus according to the invention, it may be convenient, in order to minimize its manufacturing, installation, and setting up costs, to keep the angle α small (preferably in the 5° to 10° range, and nowhere larger than 15°), and just ignore the effect thereof.

What is claimed is:

1. A process for measuring the volume of an object with at least a laser scanner, which process comprises the steps of:
    a) placing the object onto a bearing surface;
    b) defining a feed direction for the object on the bearing surface;
    c) defining a scan plane, intersecting the plane of the bearing surface along a scan base line which lies transverse to the feed direction, with a laser beam from a scanner that overlies the bearing surface being arranged to act in the scan plane;
    d) moving the object across the bearing surface along the feed direction, relative to the scan plane, until the scan plane will intersect the object;
    e) obtaining the height, above the bearing surface, of n points of measurement contained in a top face of the object and the scan plane;
    f) defining a stipulated height as a function of the measured heights of two successive points of measurement;
    g) obtaining the plan position on the bearing surface of the n points of measurement;
    h) defining a stipulated base as a function of the plan positions on the bearing surface of each pair of adjacent points of measurement;
    i) computing a stipulated area element, vertical to the bearing surface, for each pair of adjacent points of measurement, as by multiplying the stipulated base by the stipulated height;
    j) computing a stipulated area as the combined sum of the stipulated area elements computed;
    k) moving the object relative to the scan plane a predetermined feed distance along a feed direction across the bearing surface;
    l) defining a stipulated thickness as a function of the feed distance;
    m) computing a volume element by multiplying the stipulated area by the stipulated thickness;
    n) repeating steps e) to m) above until the entire object is scanned;
    o) computing the object volume as the combined sum of all the volume elements.

2. A process according to claim 1, comprising the steps of:
    p) measuring, with the scanner, the spatial position of each point of measurement within a polar coordinate reference system centered on the origin of the scanner rays;
    q) processing the values, in polar coordinates, of the position of each point of measurement so as to determine the position of each point of measurement in a Cartesian coordinate system having two axes (x,y) in the plane of the bearing surface, with the first (x) of said axes parallel to the feed direction, and a third axis (z) perpendicular to the plane of the bearing surface.

3. A process according to claim 1, wherein the stipulated height is the height of one of the two points of measurement.

4. A process according to claim 1, wherein the stipulated height is the arithmetic average between the heights of the two points of measurement.

5. A process according to claim 2, wherein the stipulated base is the difference between the values of the coordinates of the two points of measurement along the second axis (y).

6. A process according to claim 2, wherein the stipulated base is the distance between the projected points of measurement (x-y) onto the plane of the bearing surface.

7. A process according to claim 1, wherein the stipulated thickness is proportional to the feed distance.

8. A process according to claim 1, wherein the scan plane is vertical to the plane of the bearing surface.

9. An apparatus for measuring the volume of an object, comprising:
    a bearing surface for the object, whereacross an object feed direction is defined;
    at least a laser scanner overlying the bearing surface and arranged to act in a scan plane intersecting the plane of the bearing surface along a scan base line transverse to the feed direction;
    a processing unit linked to the scanner;
    a means of moving the object across the bearing surface relative to the scan plane along the feed direction;
    a means of sending a signal to the processing unit each time that the object is moved a predetermined feed distance relative to the scan plane; wherein the scanner and/or processing unit is operative to:
        reckon the height above the bearing surface of n points of measurement contained in a top face of the object and in the scan plane;
        define a stipulated height as a function of the reckoned heights of two successive points of measurement;
        reckon the plan position of the n points of measurement on the bearing surface;
        define a stipulated base as a function of the plan position on the bearing surface of each pair of adjacent points of measurement;
        compute a stipulated area element, vertical to the bearing surface, for each pair of adjacent points of measurement, as by multiplying the stipulated base by the stipulated height;
        compute a stipulated area as the combined sum of the computed stipulated area elements;
        define a stipulated thickness as a function of the feed distance;

compute a volume element by multiplying the stipulated area by the stipulated thickness;

repeat the foregoing steps until the entire object is scanned;

compute the volume of the object as the combined sum of all the volume elements.

10. An apparatus according to claim 9, wherein the bearing surface is a belt conveyor, and the means of moving the object across the bearing surface relative to the scan plane comprises a powered guide roller of the belt conveyor.

11. An apparatus according to claim 10, wherein the means of sending a signal to the processing unit each time that the object is moved a predetermined feed distance relative to the scan plane comprises an encoder active on a guide roller of the belt conveyor.

12. An apparatus according to claim 9, further comprising a means of detecting the object entering a scan zone on the bearing surface close to the scan plane.

13. An apparatus according to claim 9, further comprising a means of detecting the object exiting a scan zone on the bearing surface close to the scan plane.

14. An apparatus according to claim 9, wherein the scan plane of the laser scanner is perpendicular to the bearing surface.

15. A process for obtaining information from an object provided with an optical code, including:

i) measuring the volume of the object with at least a laser scanner, which measuring comprises the steps of:

a) placing the object onto a bearing surface;

b) defining a feed direction for the object on the bearing surface;

c) defining a scan plane, intersecting the plane of the bearing surface along a scan base line which lies transverse to the feed direction, with a laser beam from a scanner that overlies the bearing surface being arranged to act in the scan plane;

d) moving the object across the bearing surface along the feed direction, relative to the scan plane, until the scan plane will intersect the object;

e) obtaining the height, above the bearing surface, of n points of measurement contained in a top face of the object and the scan plane;

f) defining a stipulated height as a function of the measured heights of two successive points of measurement;

g) obtaining the plan position on the bearing surface of the n points of measurement;

h) defining a stipulated base as a function of the plan positions on the bearing surface of each pair of adjacent points of measurement;

i) computing a stipulated area element, vertical to the bearing surface, for each pair of adjacent points of measurement, as by multiplying the stipulated base by the stipulated height;

j) computing a stipulated area as the combined sum of the stipulated area elements computer;

k) moving the object relative to the scan plane a predetermined feed distance along a feed direction acresso the bearing surface;

l) defining a stipulated thickness as a function of the feed distance:

m) computing a volume element by multiplying the stipulated area by the stipulated thickness;

n) repeating steps e) to m) above until the entire object is scanned;

o) computing the object volume as the combined sum of all the volume elements;

ii) reading the optical code provided on the object.

16. A process according to claim 15, wherein the optical code is read with the same scanner as used for reckoning the spatial positions of the points of measurement.

* * * * *